(12) United States Patent
Thusoo

(10) Patent No.: US 8,108,443 B2
(45) Date of Patent: Jan. 31, 2012

(54) AGGREGATE FUNCTIONS IN DML RETURNING CLAUSE

(75) Inventor: Ashish Thusoo, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2180 days.

(21) Appl. No.: 10/662,095

(22) Filed: Sep. 12, 2003

(65) Prior Publication Data

US 2005/0060322 A1 Mar. 17, 2005

(51) Int. Cl.
*G06F 17/30* (2006.01)
*G06F 7/00* (2006.01)
*G06F 17/00* (2006.01)

(52) U.S. Cl. ........................ 707/803; 707/954
(58) Field of Classification Search .................. 707/803, 707/954

See application file for complete search history.

(56) References Cited

U.S. PATENT DOCUMENTS 6,567,803 B1 * 5/2003 Ramasamy et al. ............... 707/4

OTHER PUBLICATIONS

Oracle Corperation, Oracle9i SQL Referance, Release 2 (9.2) Aggregate FUnctions, 2000 pp. 4-6 to 4-8.*
Diana Lorentz, Oracle Corporation, Oracle*i*, SQL Reference, Release 3 (8.1.7), Sep. 2000, Part No. A85397-01, pp. 10-115-10-122, 11-51-11-61 and 11-141-150.
Oracle Corporation, "Oracle8i Application Developer's Guide—Fundamentals, Release 2 (8.1.6), 8 Dynamic SQL," Part No. A76939-01, 1996-2000, pp. 1-18.
Oracle Corporation, "Oracle9i Database Error Messages, Release 2 (9.2), 12 ORA-19400 to ORA-24279" Part No. A96525-01, 1996, 2002, pp. 1 and 60.
Oracle Corporation, "PL/SQL User's Guide and Reference, Release 2 (9.2), 12 Tuning PL/SQL Applications," Part No. A96624-01, 1996, 2002, pp. 1-13.
Oracle Corporation, "Oracle9i Database Error Messages, Release 2 (9.2), 6 ORA-04100 to ORA-07499," Part No. A96525-01, 1996, 2002, printed Dec. 16, 2003, pp. 1, 34, and 89.
Oracle Corporation, "Oracle9i SQL Reference, Release 2 (9.2), Delete," Part No. A96540-02, 2000, 2002, pp. 1-9.
Oracle Corporation, "Oracle9i SQL Reference, Release 2 (9.2), Scalar Subquery Expressions," Part No. A96540-02, 2000, 2002, 1 page.
Oracle Corporation, "Oracle9i SQL Reference, Release 2 (9.2), Update," Part No. A96540-02, 2000, 2002, pp. 1-11.
Oracle Corporation, "Oracle9i SQL Reference, Release 2 (9.2), Insert," Part No. A96540-02, 2000, 2002, pp. 1-18.
Oracle Corporation, "Oracle9i SQL Reference, Release 2 (9.2), 5 PL/SQL Collections and Records," Part No. A96624-01, 1996, 2002, pp. 1, 51-55.
Oracle Corporation, "PL/SQL User's Guide and Reference, Release 2 (9.2), Update Statement," Part No. A96624-01, 1996, 2002, pp. 1-4.
Oracle Corporation, "PL/SQL User's Guide and Reference, Release 2 (9.2), Insert Statement," Part No. A96624-01, 1996, 2002, pp. 1-3.
Oracle Corporation, "PL/SQL User's Guide and Reference, Release 2 (9.2), Delete Statement," Part No. A96624-01, 1996, 2002, pp. 1-3.
Oracle Corporation, "PL/SQL User's Guide and Reference, Release 2 (9.2), 8 Coding Dynamic SQL Statements," Part No. A96590-01, 1996, 2002, pp. 1-16.
John Russell, Oracle Corporation, Oracle9i, Application Developer's Guide-Funamentals, Release 2 (9.2), Mar. 2002, Part No. A96590-01, pp. 8-1-8-22.

* cited by examiner

*Primary Examiner* — Jacob F Betit
(74) *Attorney, Agent, or Firm* — Hickman Palermo Truong & Becker LLP

(57) ABSTRACT

A statement is provided having a clause that can specify an aggregate function that is performed on a set of data. The statement may alter the data in the data set by deleting or updating the data. The clause may be a returning clause that accepts one or more aggregate functions for its arguments, operates on the set of data, and returns the result of the aggregate function without returning the entire set of data. Alternatively, a statement is provided for changing multiple sets of data without the need to place the multiple sets in a single array.

24 Claims, 3 Drawing Sheets

AGGREGATE FUNCTIONS IN DML RETURNING CLAUSE

FIELD OF THE INVENTION

The field of the invention is programming languages in general, and more specifically, returning clauses in Data Manipulation Language (DML) commands.

BACKGROUND

In typical database systems, users store, update and retrieve information by submitting commands to a database server. To be correctly processed, the commands must comply with the database language that is supported by the database server. One popular database language is known as Structured Query Language (SQL).

Using SQL, DML commands can be constructed to specify operations that insert, modify, and/or delete data that exists in a database. At times, it is important for a user that is performing a DML operation to know what values were involved in the operation, and to perform subsequent operations on those values. For example, a user may want to know the old values that were deleted in a delete operation, the old values that were overwritten in an update operation, and/or the new values that were written in an update operation. For the purpose of explanation, the set of values involved in a prior operation, which are to be used in a subsequent operation, are referred to herein as "values-of-interest" (e.g., the "values-of-interest" can be which ever of the old values and the new values are of interest for performing aggregation operations).

In database systems that support SQL, a "returning" clause may be used to obtain a value-of-interest. For example, assume that a user wants to increment a value in a column, C1, of particular row (where key=5), and have the database server return the new value that was written during the update operation. The following code segment could be used to perform the desired operation:

```
update T
    set C1 = C1 + 1
    where key = 5
returning C1
```

Unfortunately, the conventional implementation of the returning clause only returns a single value-of-interest. Therefore, programmers must resort to more complex techniques in situations where (1) a first operation changes many values, thereby creating many values-of-interest, and (2) an aggregate operation is to be performed on the values-of-interest associated with the first operation. One such technique is referred to herein as the iterative technique.

According to the iterative technique, the first operation (which changes many values) is performed by iteratively executing code that only changes a single value. During each iteration, the returning clause is used to return the value-of-interest associated with that iteration. For example, assume that a user wants to increment several values in C1, and to keep track of all of the new, post-update values that are changed during the update operation. Such an operation could be performed using the following code segment.

```
For All i=1....N
    update T
        set C1 = C1 + 1
        where key = :input[i]
    returning C1 in :output [i];
```

This code segment updates values in the column C1 of table T by adding a 1 to the numbers stored in column C1 of various rows of table T. The statement "where key=:input[i]", above is an instruction to use the array input[ ] to determine which rows are update (in this specification, although grammatically incorrect, the comma was placed outside of the quotation marks to avoid ambiguities regarding the syntax).

For example, assume that input[ ] stores the following values:
input[1]=1
input[2]=3
input[3]=7
and that table T initially has the following rows:

| KEY | C1 |
|---|---|
| 1 | 23 |
| 2 | 45 |
| 3 | 2 |
| 4 | 108 |
| 5 | 95 |
| 6 | 9 |
| 7 | 10 |

During the first iteration, the "where" clause will be "where key=1", since i=1 and input[1]=1. Thus, during the first iteration, the value 23 in the first row of table T is updated to 24, and the value 24 is stored in output[1].

During the second iteration, since i=2 and input[2]=3, the value 2 is updated to 3 in the third row of table T of C1, and the value 3 is stored in output[2]. During the third iteration, since i=3 and input[3]=7, the seventh element of C1, 10, is updated to 11 and the value 11 is stored in output[3]. Thus, after finishing first three iterations, output[ ] has the values [24, 3, 11], and the updated table T has the following values:

| KEY | C1 |
|---|---|
| 1 | 24 |
| 2 | 45 |
| 3 | 3 |
| 4 | 108 |
| 5 | 95 |
| 6 | 9 |
| 7 | 11 |

Once all of the values-of-interest are captured in the output array, aggregate value may be computed based on the captured values-of-interest. For example, the sum of the captured values-of-interest may be computed by executing the code segment:

```
s=0;
For i =1...N
    s=s+:output[i];
```

This code segment initializes the variable s to have the value 0, with the statement s=0. Then, in the for-loop for each element specified by the output array, output[i], the value of the specified element is added to the variable s. The end result is that s will contain a value that represents the sum of all values-of-interest that were captured in output[ ].

The returning clause and the above scheme may be used to return the updated value involved in an operation that makes changes within a database, or return the old value that were deleted or overwritten by an operation. Extensions ".old" and ".new" may be added to the returned "data_item" to signify that the aggregation is performed based on the old or newly updated values of the set of data being modified, respectively. For example, in the above technique using an expression having sum(C1.old) would cause a summation of the old values of the column C1 to be performed.

FIG. 1 shows a simplified database system 100, and illustrates the transfer of data during the execution of the operation described above. Database system 100 includes Relational Database Management System (RDMS) 102, having Structured Query Language (SQL) engine 104. Database system 100 also includes client side stub 108, which is used by application program 109 to interface with a server side stub 106 of the RDMS 102. Application program 109 may be a program and/or another computer system. Application program 109 and/or client side stub 108 may reside on a separate processor or computer than RDMS 102. Alternatively, application program 109 and/or client side stub 108 may reside on the same processor as RDMS 102, but be part of a different process than RDMS 102.

Paths 110, 112, 114, 116, 118, and 120 are used for sending data between the components that they connect. When the above two program segments execute, external program 109 sends statements via path 118 through client side stub 108 and then along path 110 to RDMS 102. The statements are sent along path 112 and interpreted by SQL engine 104. After column C1 is updated, the updated data is returned along path 114 through server side stub 106, along path 116 to client side stub 108, and then finally along path 120 back to external program 109.

It should be noted that in the present example, the user was only interested in the sum of the old values, not in the individual old values themselves. However, for the sum of the old values to be calculated, all of the values-of-interest are returned. Performing aggregate functions using the iterative approach not only returns unnecessary data from the server to the client but may also require an evaluation of the aggregation by the application 109 on the client side. Thus, conventional methods of performing aggregate functions on values-of-interest are inefficient. Therefore, it is desirable to provide techniques for performing aggregate functions on values-of-interest that do not involve the programming complexity and wasteful data movement as experienced using conventional techniques.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EXAMPLES OF EMBODIMENTS OF THE INVENTION

Overview

Figure 1:
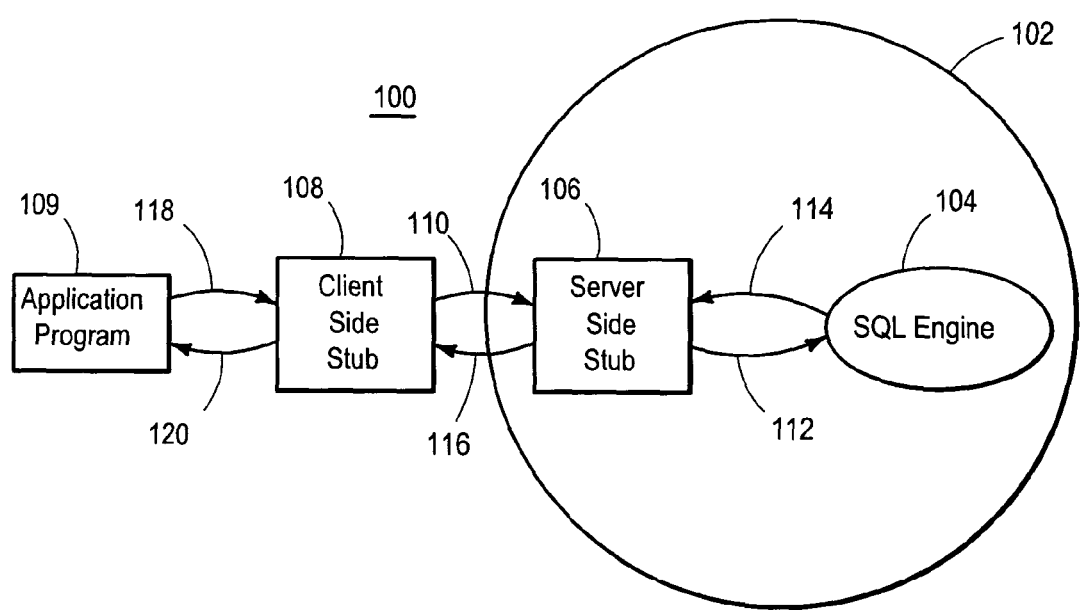
FIG. 1 shows a simplified system to illustrate the transfer of data during the execution of an aggregate function.

The present returning clause provides several features that can each be used independently of one another or with any combination of the other features. Although many of the features of the present returning clause are motivated by the problems explained above, any individual feature may not address any of the problems discussed above or may only address one of the problems discussed above. Some of the problems discussed above may not be fully addressed by any of the features of the present returning clause.

According to one embodiment, an SQL engine is provided with support for handling clauses that specify an aggregate operation to be performed on a plurality of values-of-interest. In an embodiment of the invention, the aggregate operation may be specified directly in the returning clause of the statement that defines that operation that generates the values-of-interest. In an embodiment, the returning statement may have the following syntax:

RETURNING expr [, expr] . . . INTO data_item [, data_item] . . .

where each "expr" now subsumes an aggregate function based on a single set of data.

The argument expr may specify the new set of data after being modified or the old set of data prior to modification. As indicated by the above syntax, the returning clause may accept any number of arguments, expr's. In addition to the returning clause supporting aggregate functions, each argument expr may be a variable, a set, or any other argument that the prior art returning clause could accept. Optionally, the syntax may include a delimiter demarking the end of the returning clause.

Similar to the prior art returning clause, the new returning clause may return the updated values involved in an operation that makes changes within a database, or return the old values that were deleted or overwritten by an operation. Thus, the returning clause may also be used in conjunction with update operations or delete operations, even when such operations involve many rows of data. A variety of ways of indicating whether the new or old values are to be used in performing the aggregate operation. For example, in an embodiment, prefixes "old." or "new." may be added to the returned "data_item" to signify that the aggregation is performed based on the old or newly updated values of the set of data being modified, respectively. In another embodiment, extensions ".old" and ".new" may be added to the returned "data_item" to signify that the aggregation is performed based on the old or newly updated values of the set of data being modified, respectively. In an alternative embodiment, prefixes "old." and "new." and/or extensions "old" and ".new" extensions may be added to the representation of the set of data. For example, in these embodiments using the expr of sum(C1.old)) in the returning clause would cause a summation of the old values of the column C1 to be performed. A default may be built into the returning clause for the situation where no extension is added to the returned data item or the data set of the expr, and no other indication was made as to whether to use the new or old data. For example, when no extension is explicitly added the returning clause may, by default, perform the aggregation based on the new data. In an alternative embodiment, when no extension is explicitly added the returning clause may, by default, perform the aggregation based on the old data.

Using the extended syntax of the returning clause, the aggregation operation discussed in the background for performing a summation of elements of column C1 may be replaced with:

---
Update T
    Set C1=C1+1
    Returning sum(C1) into :s;

---

In the code segment example, above, since the aggregation is performed before sending the data back to the client, the amount of data to be returned is significantly less. The aggregation happens natively in Relational Database Management System (RDBMS) server 102, and therefore is significantly faster than what can be attained were the aggregation performed at extended SQL engine 106 or CI 108. In this embodiment, a default of performing the aggregation of the new values is assumed so the sum on C1 is performed after adding the 1 to C1.

Another example, of the above syntax is

RETURNING sum(old.C1) INTO s;

which sums the elements of C1 based on the old values of C1, places the sum in s, and returns the resulting s. A further example of the above syntax is RETURNING sum(C1), avg(old.C2) INTO s, a;

which sums the new elements of C1, averages the old elements of C2, places the sum of C1 in s, places the average of C2 in a, and returns the resulting s, and a.

Manner of Operation

Figure 2:
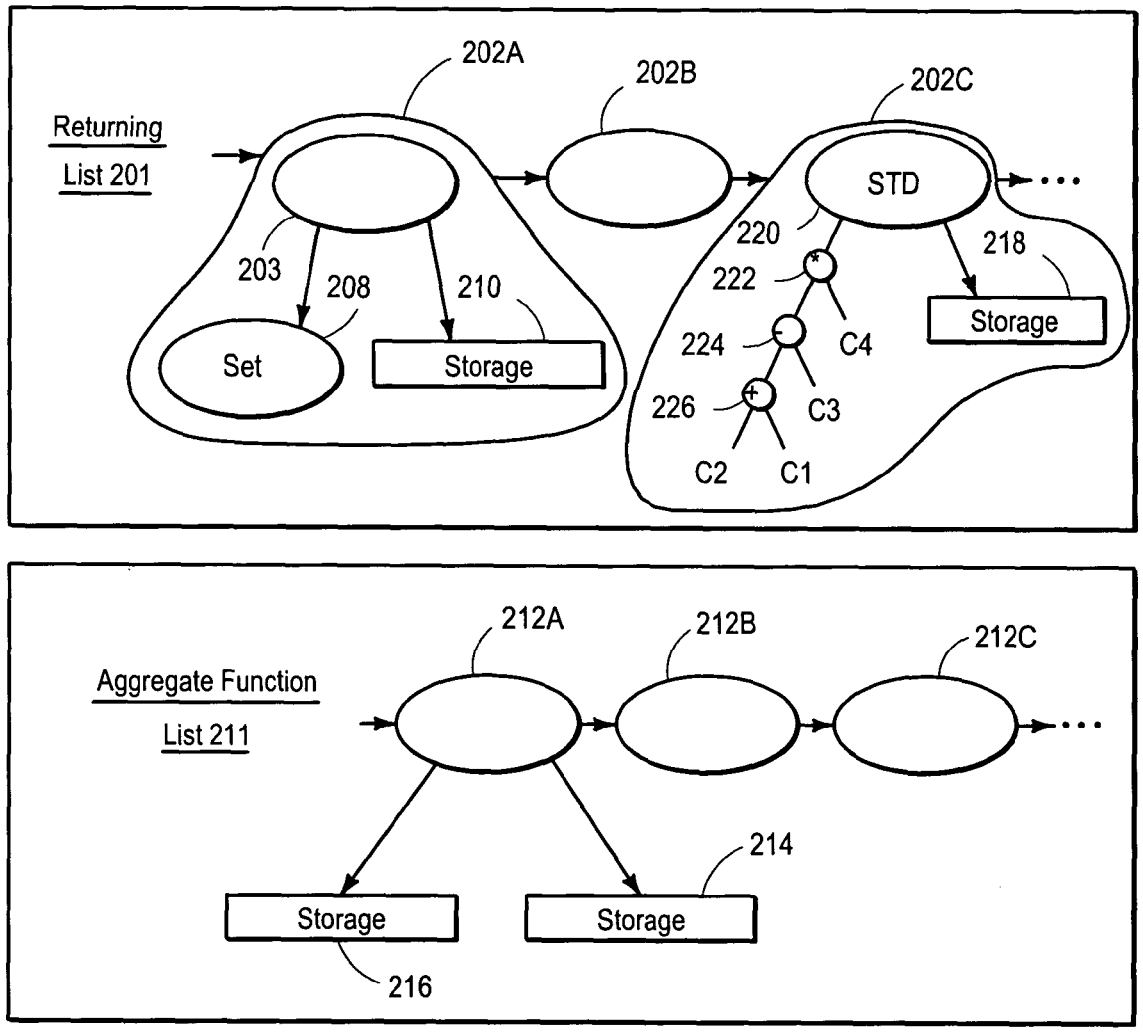
FIG. 2 is a diagram showing the parsing of the returning clause.

FIG. 2 is a diagram showing the parsing of the returning clause. At the time of parsing the list of expressions of the returning clause, a returning list 201 of the sets of data (e.g., a list of columns) being returned is set up to represent the list of expressions. For example, where the sets of data are columns of tables the returning list 201 may be referred to as a returning column list. In the returning list 201, the expressions of the returning clause are represented by operator trees 202a, 202b, 202c, . . . , respectively, which depict the operations being performed on the sets of data. The list may be generated whether or not there is an aggregation function being preformed. There may be any number of operator trees 202a, 202b, 202c, . . . .

Operator tree 202a and operator tree 202c are shown in greater detail than the operator tree 202b. Operator tree 202a includes operator 203 (e.g., an avg) having a pointer to set 208 (e.g., column C1 of the set of selected rows) and is associated with storage 210. Set 208 is the set being operated upon (e.g., column C1 of the set of selected rows), and storage 210 stores the final aggregated result of the operation (e.g., the value of the average). Thus, operator tree 202a performs avg(C1).

Operator tree 202c performs the operation std {[(C1+C2)–C3]*C4} on columns C1, C2, C3, and C4. Plus operator 226 points to columns C1 and C2 and adds the corresponding elements of C1 and C2 with one another, minus operator 224 points to column C3 and the plus operator, and subtracts C3 from the result of the addition of C1 and C2. Multiplication operator 222 points to the minus operator 224 and column C4, and multiplies the result of the subtraction with C4. Std operator 220 points to storage 218 and multiplication operator 222, and performs a standard deviation on the results of the multiplication. Storage 218 stores the results related to the std operator 218. In an embodiment each of multiplication operator 222, subtraction operator 224, and plus operator 226 may have storage areas that they are associated with for storing the results of their operations. In an alternative embodiment, operator tree 202c may have one storage area (e.g., storage 218) where the final results of the entire operation are stored. In another embodiment, the results of the sum may be stored in C2 and/or C1, the results of the subtraction may be stored in C3, and the results of the multiplication may be stored in C4. Although very simple operator trees are depicted for operator trees 202a and 202c, operator trees 202a and 202c could be much more complex.

If there are aggregations being performed as a result of the returning clause, an aggregate function list 211 is formed that includes data structures 212a, 212b, 212c, . . . (corresponding to those operators 202a, 202b, 202c, . . . that correspond to aggregate functions) that is used to perform the aggregate functions. Data structures 212a, 212b, 212c, . . . have pointers to work spaces that are used in the computation of the aggregate functions. Storage areas 214 and 216 store interim results of the aggregate operations. For example, if an average of some elements of column C1 is being performed, storage area 216 may store interim results of a summation of the elements of C1 being summed, while storage area 214 may store a count of the elements being summed. At the end of the summation, the summation stored in storage area 214 is divided by the count stored in storage area 216, and the result is sent to storage area 210.

Hardware Overview

Figure 3:
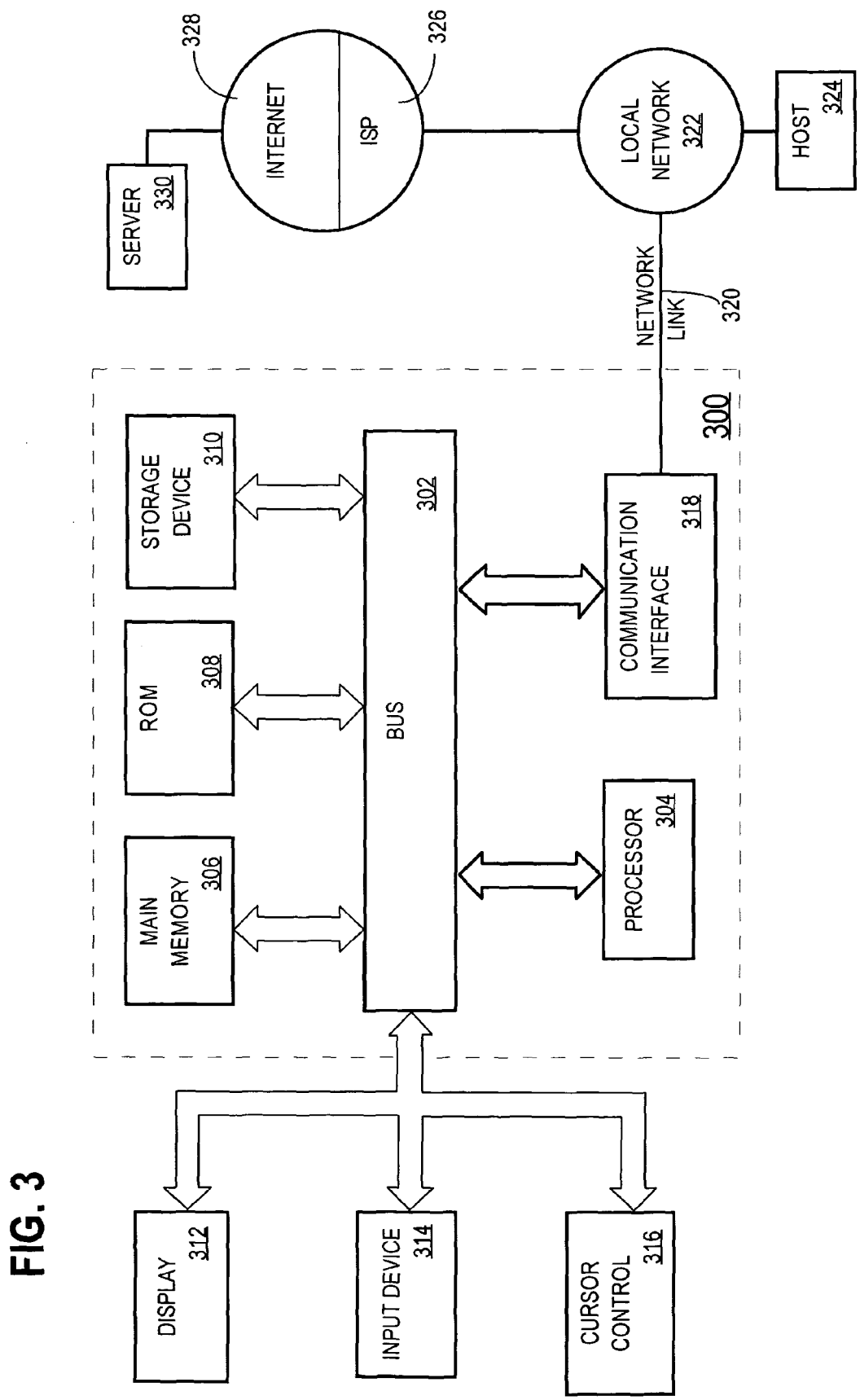
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Providing support for the clause (e.g., the returning clause) discussed above is related to the use of computer system 300 for implementing the techniques described herein. According to one embodiment of the invention, the handling (e.g., the coding, compiling, and/or execution) of the clause may be performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps associated with writing code including the clause, writing code supporting the clause, compiling, evaluating and/or other operations associated with the clause, for example. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304. Any of the computer readable media may store SQL module RDMS 102.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave. Computer 300 may be used as a database or other server having RDMS 102 (FIG. 1). Optionally, CI 108 may also be included in computer 300. Alternatively, a client computer having a similar structure to computer 300 may include CI 108 (FIG. 1).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    receiving a database statement that
        specifies a data manipulation language (DML) operation that modifies data in one or more columns in a database, and
        contains a clause that specifies an aggregate operation to be performed on a plurality of values associated with the data, wherein each of the plurality of values is from a separate row; and
    in response to receiving the database statement,
        performing the DML operation on the one or more columns in the database,
        performing the aggregate operation on the plurality of values, and
        returning as a result of the database statement a result of the aggregate operation.

2. The method of claim 1, wherein the performing of the aggregate operation is performed while performing the DML operation.

3. The method of claim 1, wherein the modified data includes values of the data before the DML operation.

4. The method of claim 1, wherein the modified data includes values of the data after the DML operation.

5. The method of claim 1, wherein the DML operation is an update of the data.

6. The method of claim 1, wherein the DML operation is a deletion of the data.

7. The method of claim 1, wherein the receiving is performed by an SQL engine.

8. The method of claim 1, wherein results of the aggregate operation are passed from an SQL engine to a server side stub without passing the data in its entirety.

9. The method of claim 8, wherein results of the aggregate operation are passed from an SQL engine to a client interface without passing the data in its entirety.

10. The method of claim 1, where the database statement is received from a client interface.

11. The method of claim 1, wherein the database statement contains multiple aggregate operations.

12. The method of claim 11, wherein performing the aggregate operation includes:
parsing the database statement;
establishing a list of operator trees, each operator tree corresponding to a different aggregate function; and
establishing an aggregate function list including structures pointing to work spaces for performing the aggregate functions.

13. The method of claim 1, wherein:
the receiving of the database statement is performed via a call interface;
the performing of the aggregate operation generates an aggregate value; and
the method further includes passing the aggregate value through the call interface without passing the plurality of values.

14. The method of claim 1, wherein:
the database statement further contains a return clause that indicates old values associated with the data; and
performing the aggregate operation on the plurality of values includes performing the aggregate operation on the old values.

15. A computer-readable medium storing a set of instructions, wherein the computer-readable medium is one of a volatile medium or a non-volatile medium, wherein the set of instructions, when executed by one or more processors, causes the one or more processors to perform a method including at least:
receiving a database statement that
specifies a data manipulation language (DML) operation that modifies data in one or more columns in a database, and
contains a clause that specifies an aggregate operation to be performed on a plurality of values associated with the data, wherein each of the plurality of values is from a separate row; and
in response to receiving the database statement,
performing the DML operation on the one or more columns in the database,
performing the aggregate operation on the plurality of values, and
returning as a result of the database statement a result of the aggregate operation.

16. The computer-readable medium of claim 15, wherein the performing of the aggregate operation is performed while performing the DML operation.

17. The computer-readable medium of claim 15, wherein the modified data includes values of the data before the DML operation.

18. The computer-readable medium of claim 15, wherein the modified data includes values of the data after the DML operation.

19. The computer-readable medium of claim 15, wherein the DML operation is an update of the data.

20. The computer-readable medium of claim 15, wherein the DML operation is a deletion of the data.

21. The computer-readable medium of claim 15, wherein the clause contains multiple aggregate operations.

22. The computer-readable medium of claim 21, wherein performing the aggregate operation includes
parsing the database statement;
establishing a list of operator trees, each operator tree corresponding to a different aggregate function; and
establishing an aggregate function list including structures pointing to work spaces for performing the aggregate functions.

23. The computer-readable medium of claim 15, wherein:
the receiving of the database statement is performed via a call interface;
the performing of the aggregate operation generates an aggregate value; and
the set of instructions includes further instructions which, when executed by the one or more processors, further cause the one or more processors to perform passing the aggregate value through the call interface without passing the plurality of values.

24. The computer-readable medium of claim 15, wherein:
the database statement further contains a return clause that indicates old values associated with the data; and
performing the aggregate operation on the plurality of values includes performing the aggregate operation on the old values.

* * * * *

UNITED STATES PATENT AND TRADEMARK OFFICE
CERTIFICATE OF CORRECTION

| | |
|---|---|
| PATENT NO. | : 8,108,443 B2 |
| APPLICATION NO. | : 10/662095 |
| DATED | : January 31, 2012 |
| INVENTOR(S) | : Thusoo |

It is certified that error appears in the above-identified patent and that said Letters Patent is hereby corrected as shown below:

On Title Page, item (56); in column 1, under "Other Publications", line 1, delete "Corperation," and insert -- Corporation, --, therefor.

On Title Page, item (56); in column 1, under "Other Publications", line 1, delete "Referance," and insert -- Reference, --, therefor.

On Title Page, item (56); in column 2, under "Other Publications", line 28, delete "Funamentals," and insert -- \Fundamentals, --, therefor.

In column 2, line 13, delete "update" and insert -- updated --, therefor.

In column 2, line 57, delete "value" and insert -- values --, therefor.

In column 3, line 8, delete "value" and insert -- values --, therefor.

In column 3, line 9, delete "value" and insert -- values --, therefor.

In column 4, line 57, delete ""old"" and insert -- ".old" --, therefor.

In column 4, line 60, delete "sum(C1.old))" and insert -- sum(C1.old) --, therefor.

Signed and Sealed this
First Day of May, 2012

David J. Kappos
*Director of the United States Patent and Trademark Office*